US00RE48236E

(19) United States
(12) Reissued Patent
Kehoe et al.

(10) Patent Number: US RE48,236 E
(45) Date of Reissued Patent: Oct. 6, 2020

(54) EXERCISE DEVICE

(71) Applicants: Michael Kehoe, Kilteman (IE); William McCarthy, Dublin (IE)

(72) Inventors: Michael Kehoe, Kilteman (IE); William McCarthy, Dublin (IE)

(21) Appl. No.: 15/685,251

(22) Filed: Aug. 24, 2017

Related U.S. Patent Documents

Reissue of:
(64) Patent No.: 9,114,273
Issued: Aug. 25, 2015
Appl. No.: 13/810,409
PCT Filed: Jul. 18, 2011
PCT No.: PCT/EP2011/062276
§ 371 (c)(1),
(2) Date: Jan. 15, 2013
PCT Pub. No.: WO2012/007592
PCT Pub. Date: Jan. 19, 2012

(30) Foreign Application Priority Data

Jul. 16, 2010 (IE) ..... 2010/0442

(51) Int. Cl.
*A63B 1/00* (2006.01)
*A63B 21/16* (2006.01)
(Continued)

(52) U.S. Cl.
CPC ..... *A63B 21/00047* (2013.01); *A63B 21/068* (2013.01); *A63B 21/1627* (2013.01); *A63B 21/1636* (2013.01)

(58) Field of Classification Search
CPC ..... A63B 21/1636; A63B 21/1627
(Continued)

(56) References Cited

U.S. PATENT DOCUMENTS 2,817,523 A * 12/1957 Laskey et al. ..... A63B 1/00 248/240.3
3,593,708 A * 7/1971 Steele ..... A61H 1/0218 482/144

(Continued)

FOREIGN PATENT DOCUMENTS

CA 2711120 C 10/2010
EP 2052761 A1 4/2009

(Continued)

OTHER PUBLICATIONS

International Search Report issued in PCT/EP2011/062276, mailed on Sep. 28, 2011.

(Continued)

*Primary Examiner* — Russell D Stormer
(74) *Attorney, Agent, or Firm* — Richard G. Topolewski

(57) ABSTRACT

An exercise apparatus for the performance of tricep dip exercise and the like. The apparatus comprises first and second elongate members, which are adapted to be brought into fixed positional arrangement relative to each other. The first upper end of each member is adapted to be brought into engagement with a substantially horizontal member of a pull up or chin up bar, while the second, lower end of each tubular member is adapted to form, or is conjoined to, a hand [grips means] *grip*. The hand [grip means is] *grips are* provided in a direction which is substantially perpendicular to the main body of the first and second member. A third member is conjoined to the first and second members about their lower ends.

17 Claims, 9 Drawing Sheets

(51) Int. Cl.

| | |
|---|---|
| ***A63B 21/00*** | (2006.01) |
| ***A63B 21/068*** | (2006.01) |
| ***A63B 21/02*** | (2006.01) |
| ***A63B 3/00*** | (2006.01) |

(58) Field of Classification Search
USPC ..... 482/39, 40
See application file for complete search history.

(56) References Cited

U.S. PATENT DOCUMENTS

| | | | | |
|---|---|---|---|---|
| 3,716,232 | A * | 2/1973 | Johnson | A63B 1/005 482/40 |
| 3,738,650 | A | 6/1973 | Ossenkop et al. | |
| 3,915,452 | A | 10/1975 | Winblad | A63B 1/005 248/208 |
| 4,529,191 | A | 7/1985 | Miller et al. | |
| 4,662,629 | A | 5/1987 | Plovie | |
| 4,844,448 | A | 7/1989 | Niznik | A63B 21/04 482/129 |
| 5,417,628 | A | 5/1995 | Vanderbleek | |
| 5,776,033 | A | 7/1998 | Brown | |
| 5,839,994 | A | 11/1998 | Elbogen | |
| 5,871,422 | A | 2/1999 | Elbogen | |
| 6,179,748 | B1 * | 1/2001 | Barr | A63B 1/00 482/38 |
| 6,508,743 | B1 | 1/2003 | Fortin | |
| D633,156 | S * | 2/2011 | Caswell | D21/679 |
| D633,961 | S * | 3/2011 | Loew | D21/679 |
| D667,901 | S * | 9/2012 | Garcia Chavez | D21/679 |
| 8,535,204 | B2 * | 9/2013 | Stacey | 482/40 |
| 8,622,875 | B2 * | 1/2014 | Ho | 482/40 |
| 2005/0250619 | A1 * | 11/2005 | Daikeler et al. | A63B 1/00 482/40 |
| 2010/0234193 | A1 * | 9/2010 | Friedman et al. | 482/133 |
| 2012/0046150 | A1 * | 2/2012 | Stacey | A63B 1/00 482/131 |
| 2012/0094808 | A1 * | 4/2012 | Leier | A63B 1/00 482/40 |
| 2013/0178338 | A1 * | 7/2013 | Ross | 482/40 |
| 2013/0225373 | A1 * | 8/2013 | Poat | 482/40 |
| 2013/0244836 | A1 * | 9/2013 | Maughan et al. | 482/40 |
| 2014/0302968 | A1 * | 10/2014 | Velikin et al. | 482/40 |

FOREIGN PATENT DOCUMENTS

| | | | |
|---|---|---|---|
| GB | 2299520 | * | 10/1996 |
| GB | 2299520 | A | 10/1996 |

OTHER PUBLICATIONS

Written Opinion of the International Searching Authority issued in PCT/EP2011/062276, mailed on Sep. 28, 2011.

* cited by examiner

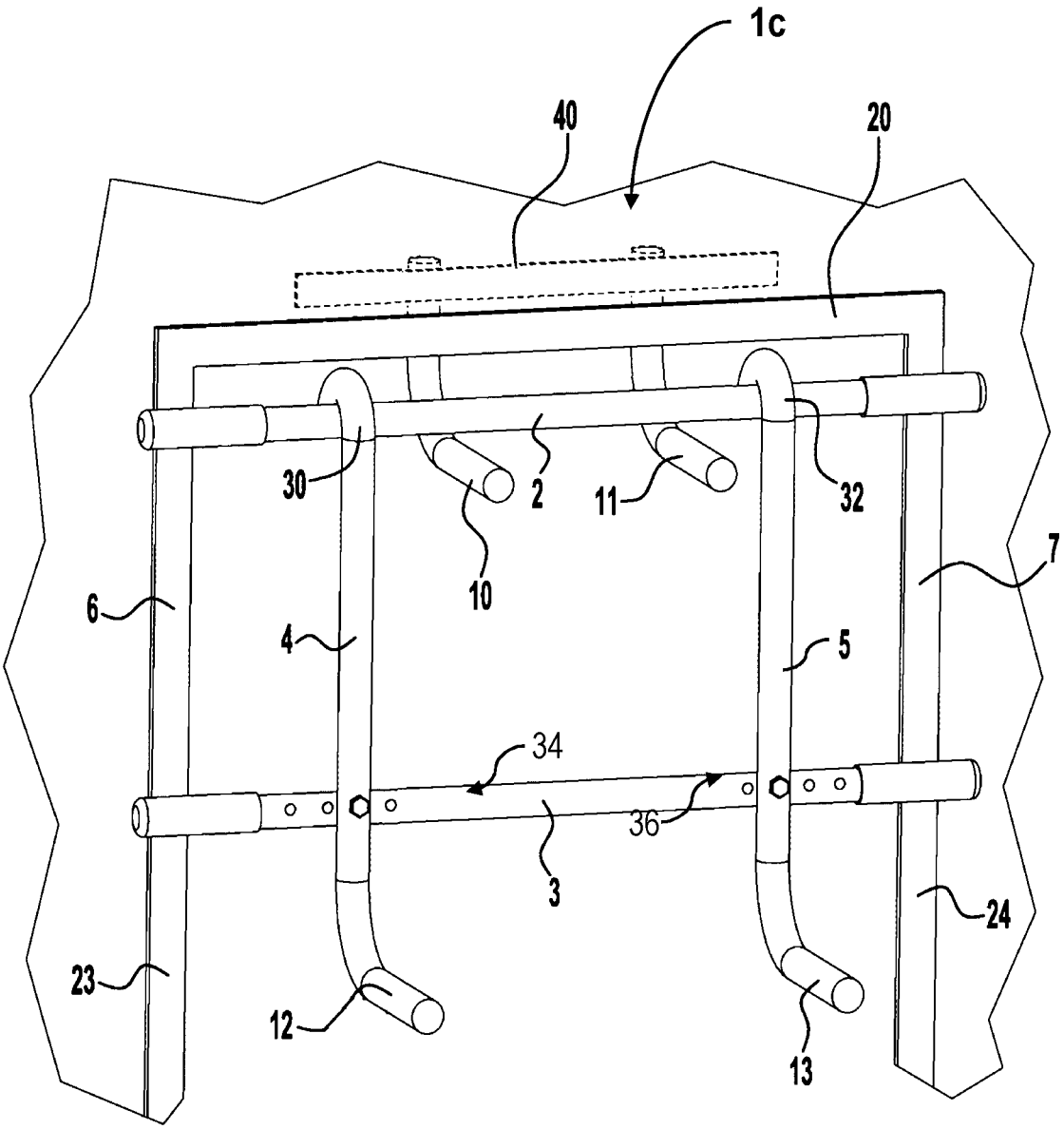
- -Fig. 7- -
Amended

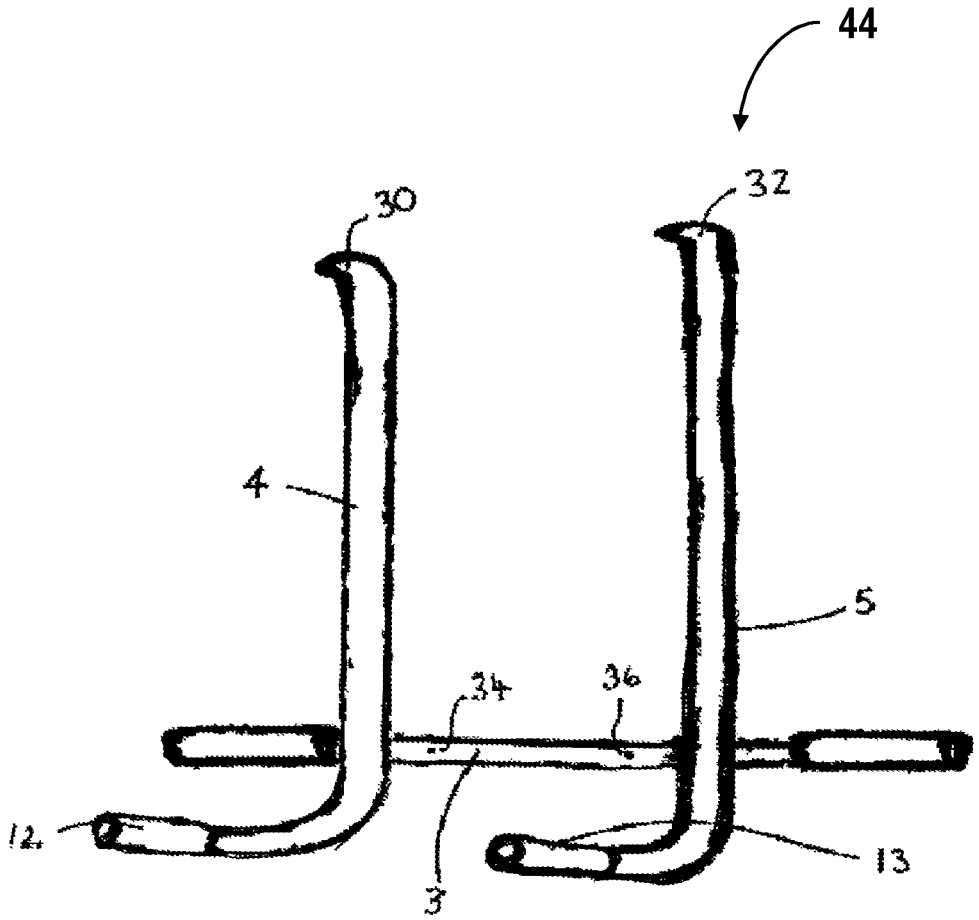
Fig. 7A
New

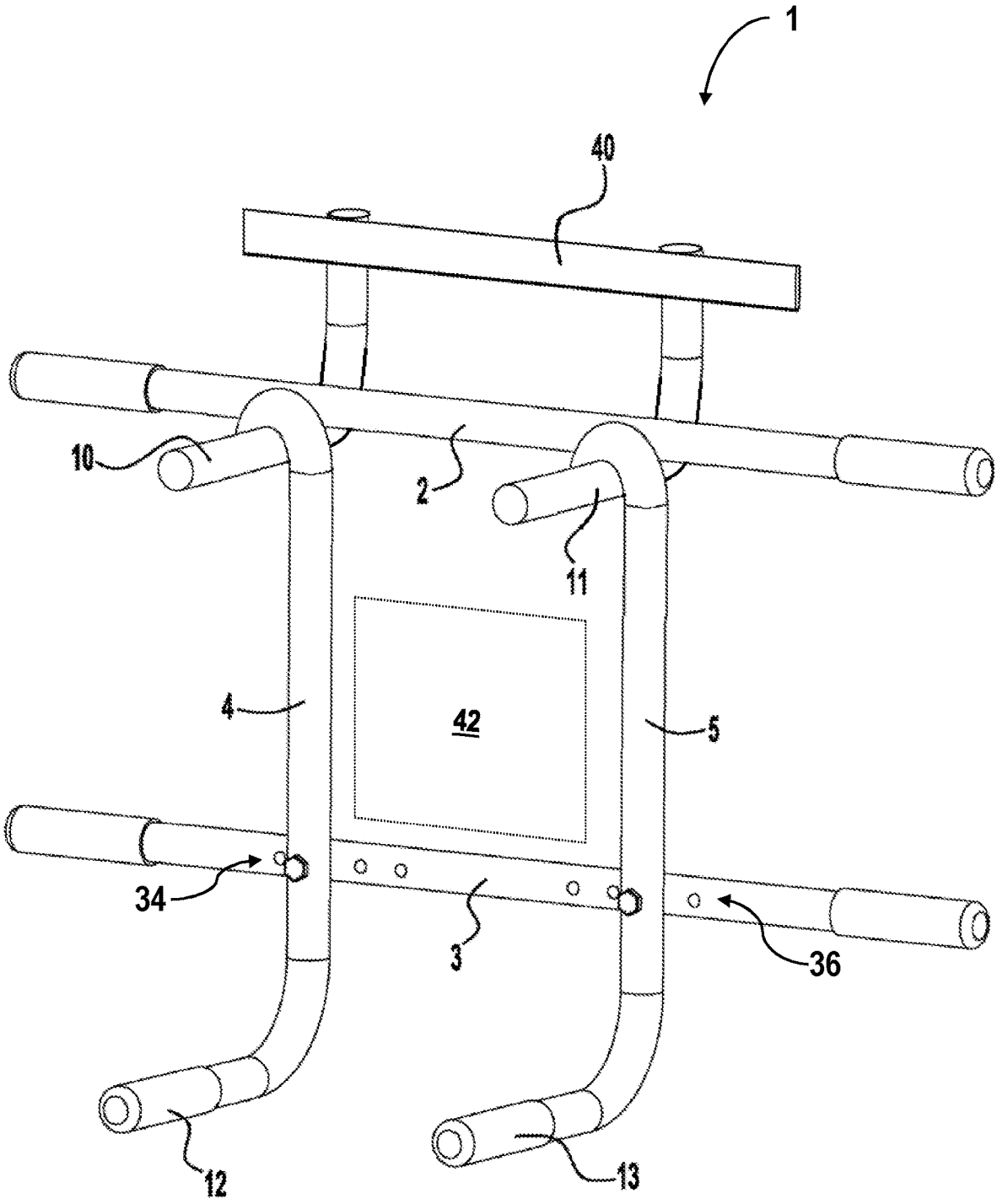
Fig. 7B
New

Prior Art
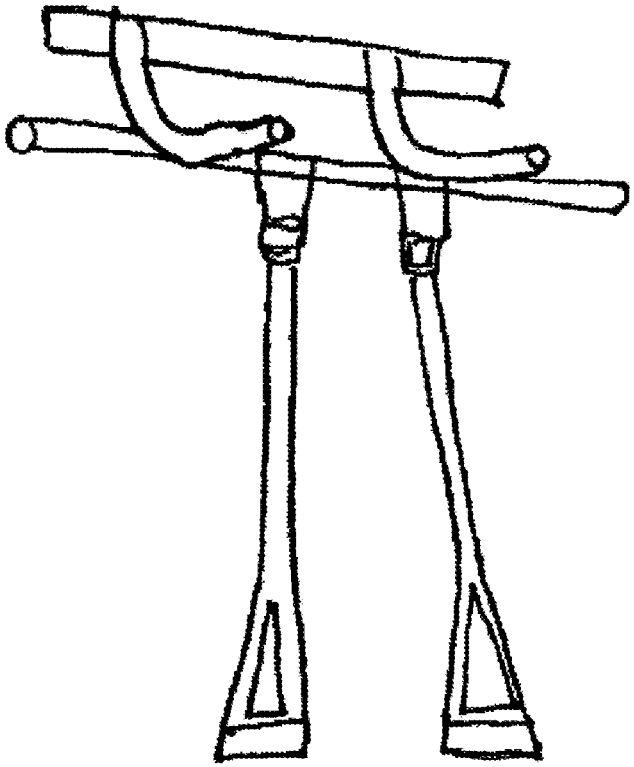
Fig 7C
New

EXERCISE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 9,114,273, which issued Aug. 25, 2015.*

FIELD OF THE INVENTION

The present invention relates to an exercise device for use in performing body weight exercises to facilitate the development and maintenance of strength and fitness. In particular there is provided an apparatus which allows for the performance of dips and bodyweight pull up exercises. Typically the apparatus can be attached to a chin up or pull up bar which is fitted to a door frame or other suitable surface, such as a wall.

BACKGROUND TO THE INVENTION

Pull up and chin up bars are commonly used in the performance of exercise, particularly in the performance of bodyweight strength improving exercises. Such pull up bars conventionally consist of a straight bar which is mounted to or within a door frame, where they would be secured to the door frame or surrounding architrave by a variety of means. More recently doorway mounted pull up bars have been modified to allow them to be removably fitted to a door way, without the need to physically screw or affix the pull up bar to the door frame. This is achieved by counterbalancing the pull up bar to opposing faces of the door frame and anchoring the pull up bar at the top of the door frame, typically by bringing the pull up bar into resting engagement with a top face of a horizontal architrave on the side of the doorway opposite to the side at which the user will stand when using the pull up bar. Examples of such removable pull up bars are disclosed in U.S. Pat. No. [5,417,218] *5,417,628* and U.S. Pat. No. [6,179,418] *6,179,748*.

Pull up bars may also be referred to as chin up bars. A pull up bar can be used to perform pull ups or chin ups, as desired, by changing the position of the hands on the pull up bar. In order to further enhance the utility of a pull up bar, straps with grips of rings can be hung from the pull up bar. These straps can be gripped by a user in order to allow the performance of further exercises, most particularly tricep dips and upward bodyweight rows. An example of a chin up bar which has such straps hung thereon is shown in FIG. 6. However, such an arrangement suffers from the disadvantage that the handgrips are not positioned in a constant position. This means that the straps can flex when the users grips them, or during performance of the exercise. This means that the user can expend effort ensuring that the hands are kept at a constant distance apart, rather than focusing on performing consistent repetitions of the particular exercise which will result in specific muscle groups being exercised.

It is an object of the present invention to provide an improved product which can be brought into releasable engagement with a pull up bar, in particular a door mounted pull up bar, in order to allow a user to perform additional exercises, such as tricep dips and bodyweight pull ups.

SUMMARY OF THE INVENTION

Following extensive research and testing, the present inventor has developed an apparatus which can be brought into releasable engagement with a door mounted pull up bar in order to allow a user to perform a greater range of exercises to develop muscle strength.

According to a first aspect of the present invention there is provided an exercise apparatus for the performance of tricep dips exercises and the like, said apparatus comprising at least first and second elongate members, said members being adapted to be brought into a fixed positional arrangement relative to each other, wherein a first, upper, end of each member is adapted to be brought into engagement with a substantially horizontal member of a pull up or a chin up bar, while a second, lower, end of each member is adapted to form or is conjoined to a respective first and second hand grip means, said hand grip means being provided in a direction which is substantially perpendicular to the elongate member.

In certain embodiments the first and second members are held in a fixed positional arrangement relative to each other by means of a third member which is positioned in a substantially horizontal position and which is conjoined to each of the first and second member in order to hold said first and second member at a fixable distance from each other.

The third member can be conjoined to each of the first and second members by any suitable fixing means which may be permanent or releasable. For example, the fixing means may typically be a bolt and associated nut which serves to attach the third member to each of the first and second members by way of coupling through apertures defined in third member which are brought into alignment with complementary apertures in the first and second members. In certain embodiments, a single aperture is provided in each of the first and second members, but a plurality of apertures may be provided in the third member in order to allow the fixed position arrangement between the first and second members to be set to different distances (widths). The ability to adjust the width between the first and second members can be important as this can alter the distance between the first and second hand grip means, thus contributing to the comfort of the user, when using the apparatus. For example, the first and second members may be more widely laterally spaced when the apparatus is to be used by a male user with broad shoulders, but suitably adjusted to a more narrow lateral spacing when the apparatus is to be used by a female user who may have more narrow shoulders.

In certain embodiments first and second surface grip means are provided or defined at either end of the third member. Preferably, said surface grip means extend laterally outwardly from a region of the third member where the third member is conjoined to the first and second members.

Preferably, the first and second hand grip means extend substantially perpendicular to a plane in which the first and second elongate members are positioned.

In certain embodiments the first and second hand grip means comprise foam grips, rubber grips, or the like.

In certain embodiments, respective upper portions of the first and second member are brought into engagement with a substantially horizontal member of a pull up or a chin up bar in a releasable manner. Typically, the first and second members are brought into releasable engagement with the pull up or the chin up bar via a connecting means. Typically, no modifications need to be made to the pull up or the chin up bar to which the exercise apparatus of the present invention is being conjoined in order to allow it to become attached. In certain embodiments, the upper portion of the first and second members define, or are attached to the connecting means and, preferably, the connecting means comprise hook-like means which are adapted to be hooked over a horizontal or substantially horizontal portion of a chin up or pull up bar.

In certain embodiments, the first, second and/or third members are made of a rigid material, typically metal, such as iron, steel or the like.

Preferably, first, second and/or third members are tubular in cross-section but not limited thereto.

In one arrangement, the first and second members are substantially upright and are laterally spaced apart.

In another variation, the first and the second members are co-joined at an intermediate point, preferably, to form an X-like arrangement.

Preferably, the first and second members are moveable relative to each other at the intermediate point, e.g. pivotable about a central axis, thereby allowing the first and second members to intersect in a scissor-like folding and unfolding manner, thereby facilitating storage of the apparatus. Preferably, the third member is configured to hold upper ends and lower ends of the first and second members at a fixed distance from each other. In one variation, the third member is foldable so that it unfolds and, preferably, locks to hold the respective upper and lower ends of the first and second members at a specific distance apart, and unlocks and folds, e.g. in half, or similar, to allow the X-configuration of the first and second members to be brought together into a closed scissor formation for storage. In such an arrangement, the first member provides a left hand side fixing and a right hand side grip means while the second member provides a right hand side fixing means and a left hand side grip means for a person standing with their back to the apparatus.

Preferably, the exercise apparatus comprises means to mount the exercise apparatus to a door frame around a doorway structure.

Preferably, the mounting means comprises a first mounting element for engaging against a lintel part of the door frame. More preferably the first mounting element is configured to engage against an upper sill of the lintel part of the door frame. The first mounting element is preferably configured to rest upon the upper sill.

Preferably, the mounting means further comprises a second mounting element for engaging against at least one and preferably a pair of jamb part(s) of the door frame. Preferably the first mounting element is configured to engage against the lintel part of the door frame at a first side of the doorway, and the second mounting element is configured to engage against the jamb part(s) of the door frame at a second side of the doorway which is opposite to the first side of the doorway.

Ideally, the second mounting element is configured to engage against an upper region of the jamb part of the door frame which is adjacent to the lintel part of the door frame. Most preferably the distance between the upper region of the jamb part of the door frame and the lintel part of the door frame is less than 0.4 m. The distance between the upper region of the jamb part of the door frame and the lintel part of the door frame may be less than 0.3 m. The distance between the upper region of the jamb part of the door frame and the lintel part of the door frame may be less than 0.2 m.

Preferably, the second mounting element is configured to exert a force against the jamb part of the door frame in a direction substantially perpendicular to the plane of the doorway, preferably, under gravity, combined, when the exercise apparatus is in use, with the weight of the user while the first mounting element exerts a force substantially perpendicular to the upper sill. Ideally, the mounting means comprises a connecting means, e.g. connector bars, to connect the first mounting element to the second mounting element.

Ideally, the first and second members of the exercise apparatus are releasably engageable with the second mounting element.

Ideally, the second mounting element comprises the pull up or chin up bar.

In one embodiment, the mounting means comprises a third mounting element for engaging against at least one jamb part of the door frame. The third mounting element enhances the stability of the mounting of the apparatus to the door frame. Preferably the third mounting element is configured to engage against the jamb part of the door frame on the second side of the doorway. Ideally, the third mounting element is configured to engage against a lower region of the jamb part of the door frame which is spaced apart from the lintel part of the door frame. Ideally, the third member of the exercise apparatus is adapted to act as the third mounting element. Preferably, the surface grip means of the third member are adapted to grip the lower region of the jamb part of the door frame. By arranging the third mounting element spaced apart from the second mounting element, this further enhances the stability of the mounting of the apparatus to the door frame. The third mounting element is preferably configured to exert a force against a jamb part of the door frame in a direction substantially perpendicular to the plane of the doorway. Most preferably the distance between the lower region of the jamb part of the door frame and the lintel part of the door frame is at least 0.5 m. The distance between the lower region of the jamb part of the door frame and the lintel part of the door frame may be at least 0.75 m. The distance between the lower region of the jamb part of the door frame and the lintel part of the door frame may be at least 1 meter.

Preferably, the hand grip means is, in use, located at a height which is approximately equal to half of the height of the doorway. This location for the hand grip means is particularly suitable for a user to perform bodyweight dip exercises and/or bodyweight row exercises. Ideally, the hand grip means is configured to be located in use spaced downwards apart from the lintel part of the door frame.

Most preferably, the distance between the hand grip means and the lintel part of the door frame is configured to be at least 0.5 m. The distance between the hand grip means and the lintel part of the door frame may be configured to be at least 0.75 m. The distance between the hand grip means and the lintel part of the door frame may be configured to be at least 1 m.

In another embodiment, the hand grip means is spaced apart from the second mounting element. This location for the hand grip means is particularly suitable for a user to perform bodyweight dip exercises and/or bodyweight row exercises. Preferably the distance between the hand grip means and the second mounting element is at least 0.5 m.

The distance between the hand grip means and the second mounting element may be at least 0.75 m. The distance between the hand grip means and the second mounting element may be at least 1 m.

In one case, the hand grip means is configured to be located on the second side of the doorway when the exercise apparatus is installed. Preferably, the hand grip means is substantially elongate.

Ideally, a longitudinal axis of the hand grip means is configured to extend in a direction substantially perpendicular to the plane of the doorway. This arrangement of the hand grip means is particularly suitable for a user to perform bodyweight dip exercises and/or bodyweight row exercises.

BRIEF DESCRIPTION OF THE DRAWINGS

The invention will be more clearly understood from the following description of embodiments thereof, given by way of example only, with reference to the accompanying drawings, in which:

[FIG. 7 shows an embodiment] *FIGS. 7, 7A, and 7B show embodiments* of [an] *exercise* apparatus according to the present invention.

*FIG. 7C shows prior art of an exercise apparatus that needs a mounting element such as a door mount pull up bar,*

DETAILED DESCRIPTION

Figure 1:
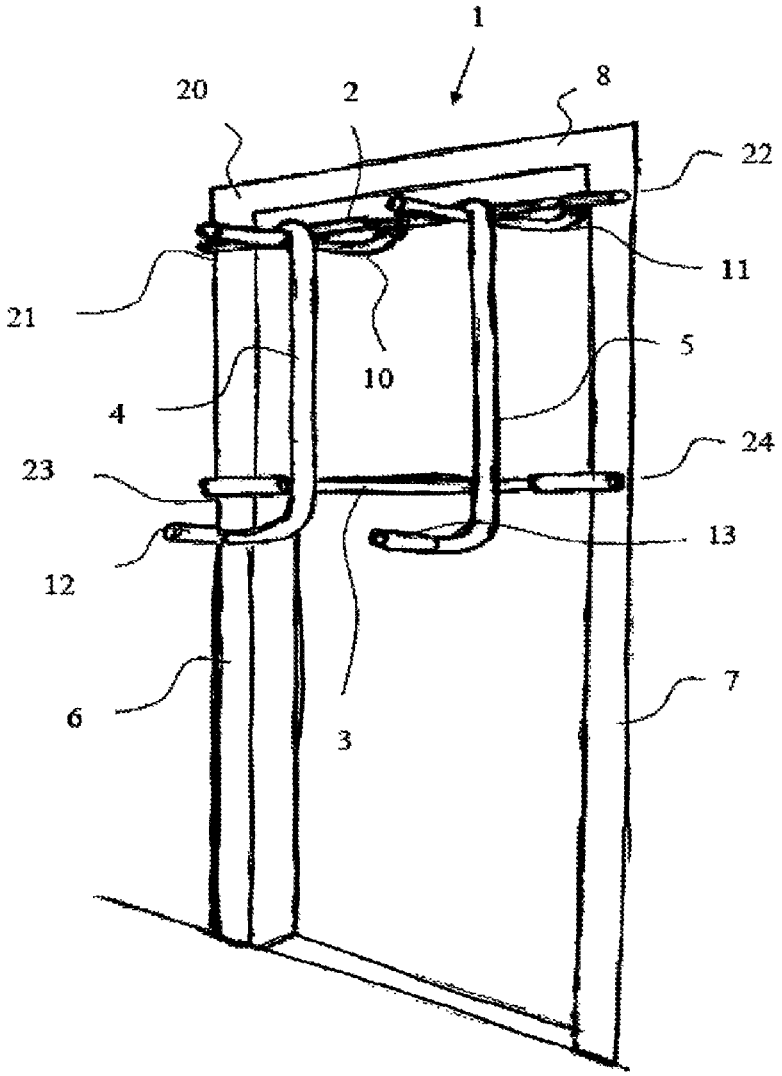
FIG. 1 is an isometric view of an exercise apparatus according to the invention engaged with a pull up bar which has been mounted to a door frame around a doorway.
Figure 2:
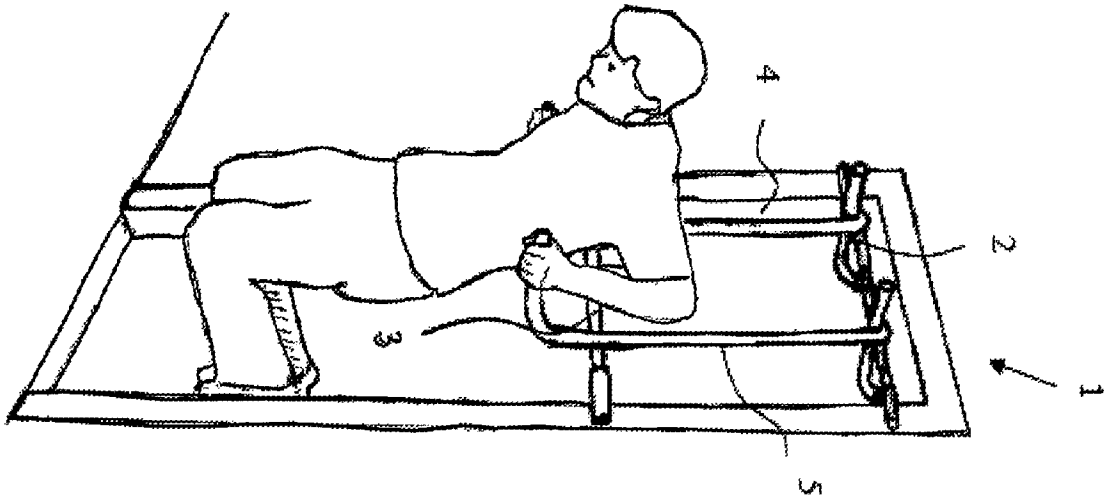
FIGS. 2 and 3 are isometric views of a user performing bodyweight dip exercises using the exercise apparatus of FIG. [7] *7B*.
Figure 3:
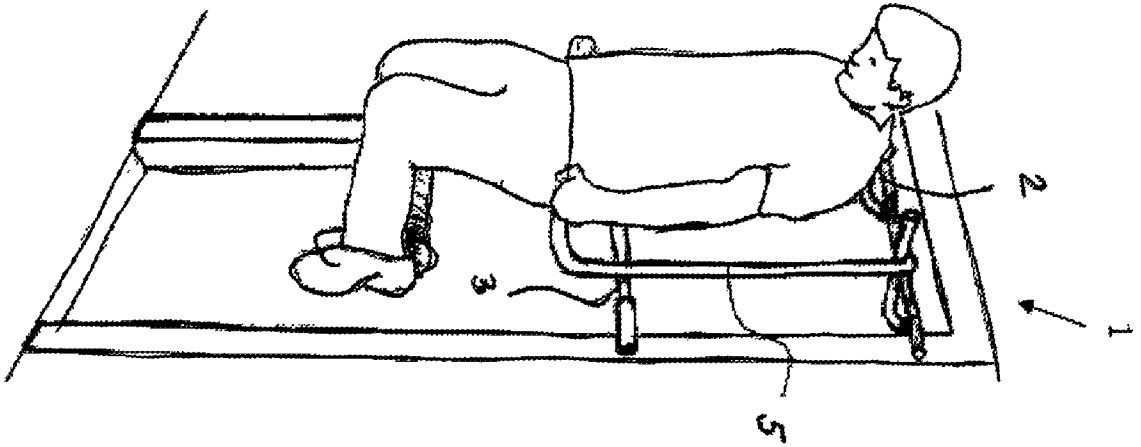
Figure 4:
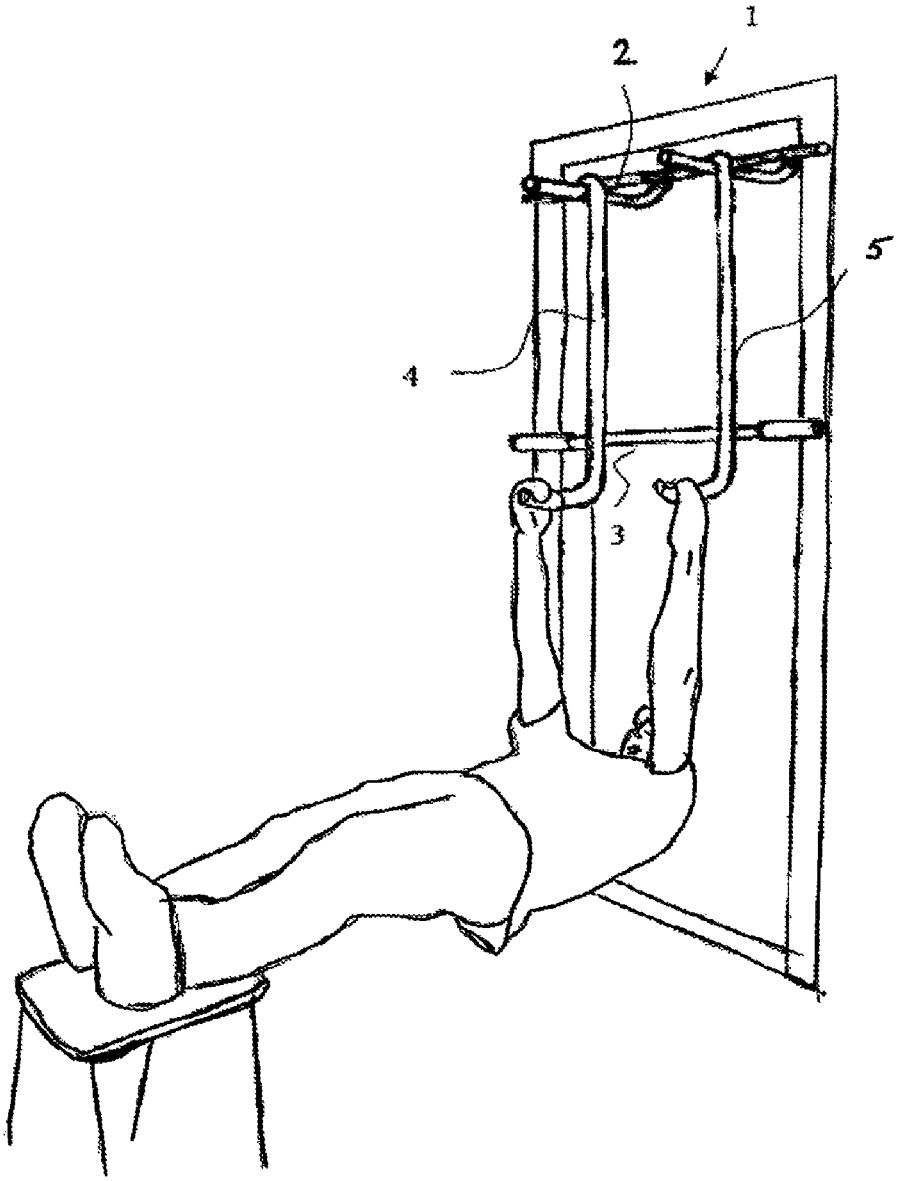
FIGS. 4 and 5 are isometric views of a user performing bodyweight row exercises using the exercise apparatus of FIG. [7] *7B*.
Figure 5:
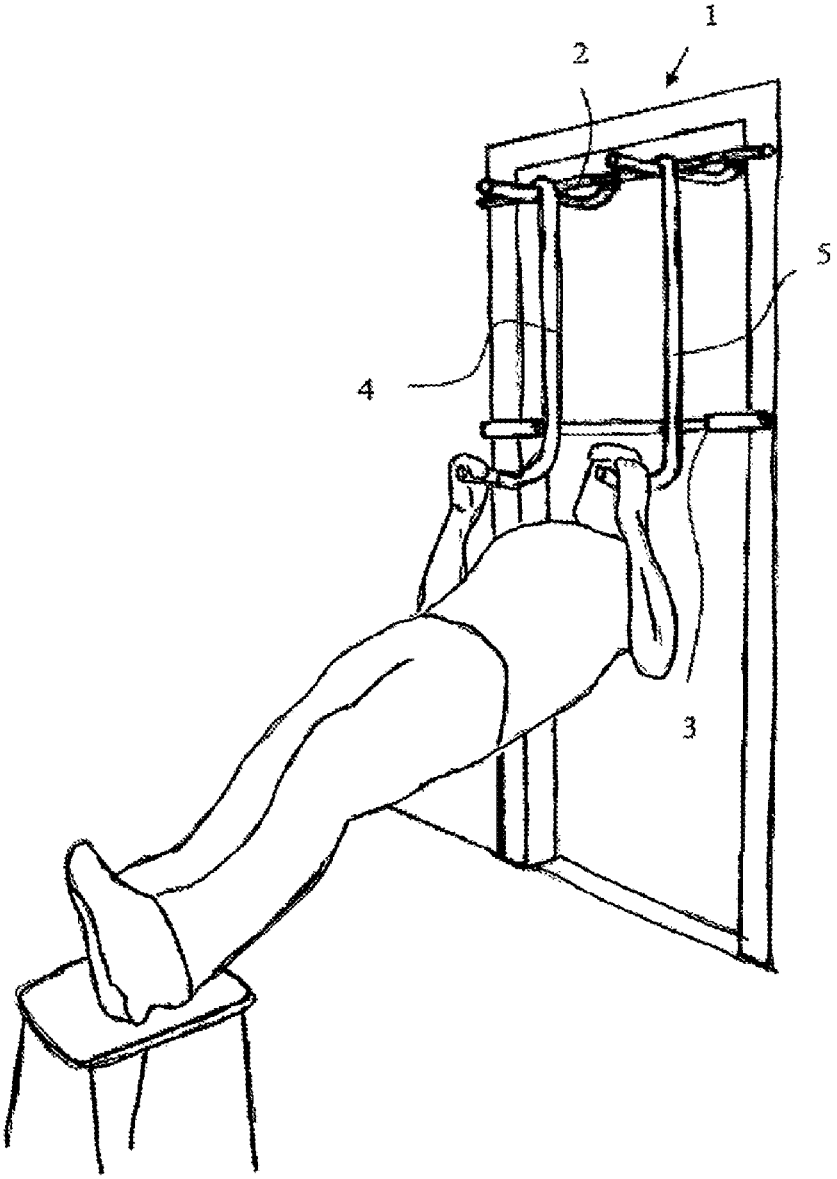
Figure 6:
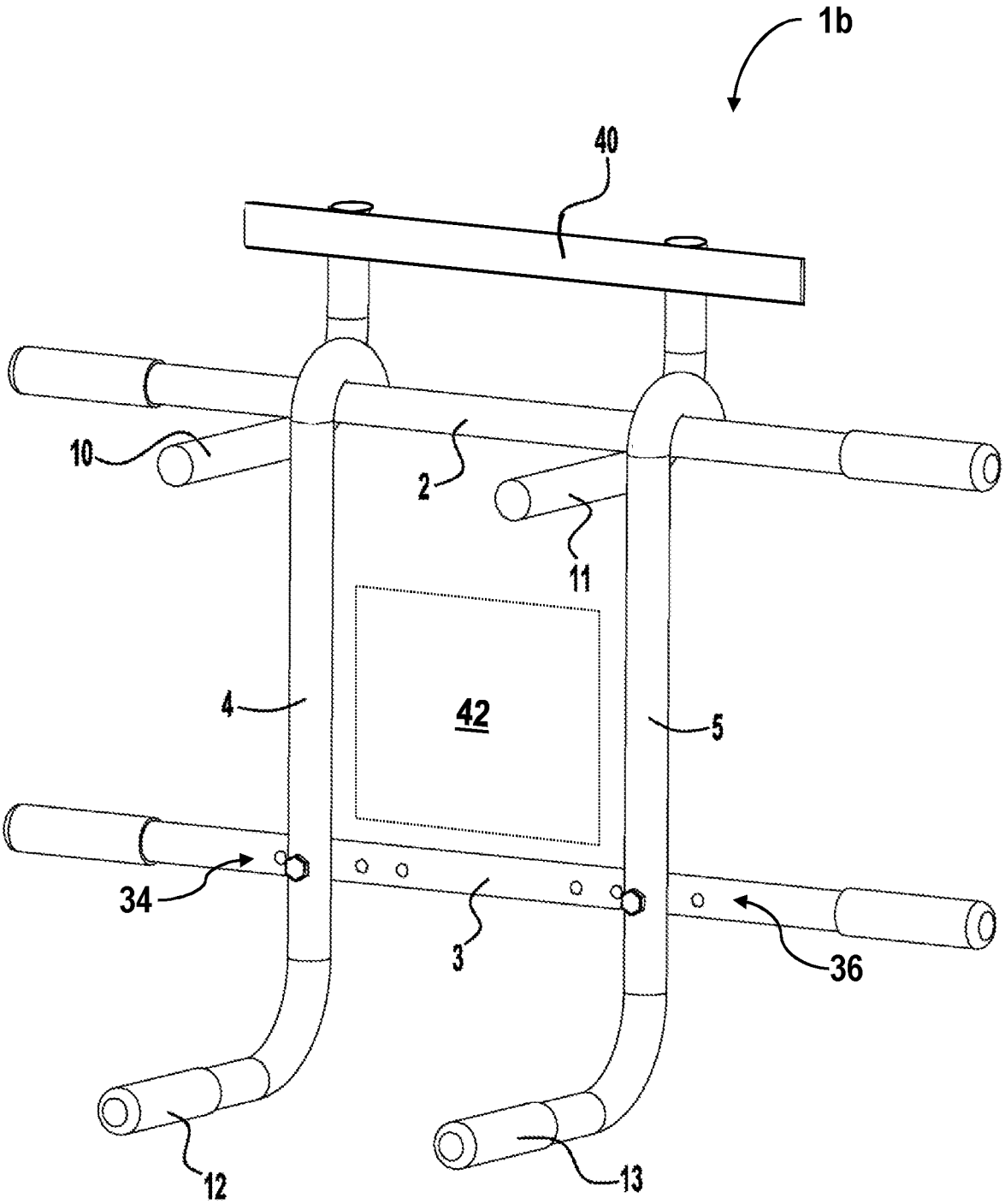
FIG. 6 shows an apparatus of the prior art which uses straps conjoined to a doorway mounted pull up bar to perform dips exercises.

Referring to [FIG. 7,] *FIGS. 7, 7A, 7B, and 6* there [is] *are* shown [a] non-limiting [example] *examples* of [an embodiment] *embodiments* of the exercise apparatus according to the present invention. [FIG. 7 shows] *FIGS. 7, 7A, 7B and 6 show* first and second elongate tubular members 4, 5 said tubular members are provided to be positioned in a substantially downward direction when conjoined to a pull up bar or chin up bar. Typically the first and second members 4, 5 are composed of a moulded tubular member, or the like. The first and second members 4, 5 however do not need to be tubular in shape and they can assume any other cross-sectional shape which allows the rigidity of the members to be maintained. The first and second members 4, 5 are adapted to be brought into a fixed positional arrangement relative to each other. This is important so that respective hand grip means 12, 13 (preferably provided in the form of bars) of the first and second members *4, 5* are kept in a fixed positional relationship to each other. That is, the hand grip means 12, 13 should remain static and not move when a user is holding the hand grip means 12, 13 and performing dips exercises as shown in FIGS. 2 and 3, or bodyweight rows, as shown in FIGS. 4 and 5. Typically, an upper portion 30, 32 of each tubular member 4, 5 is adapted to be brought into engagement with a substantially horizontal member of a chin up or pull up bar [while a]. *The first and second members are releasably engaged to the doorway mounted pull up bar via a connecting means. The connecting means may comprise a hook which can be hooked over a horizontal or substantially horizontal portion of the doorway mounted pull up bar. A* second, lower portion of each tubular member 4, 5 is adapted to form or is conjoined to the hand grip means 12, 13 said hand grip means *12, 13* being provided in a direction which is substantially perpendicular to the main body of the tubular member 4, 5 and the horizontal member of the chin up bar 30, 32. *The first and second elongate members 4, 5 make a plane 42.*

Typically the first and second members 4, 5 are held in a fixed positional arrangement relative to each other by means of a third member 3 which may also be tubular or of any other suitable cross sectional strength to maintain the rigidity of the third member 3. The third member 3 is positioned in a substantially horizontal position (perpendicular direction) with respect to the substantially vertical first and second member 4,5. The third member 3 is conjoinable to each of the first and second members 4, 5 in order to hold said first and second members 4, 5 at a fixable distance from each other along the axis of the third member 3.

The third member 3 is conjoinable to each of the first and second members 4, 5 by any suitable fixing means which may be permanent or releasable. For example, the fixing means may typically be a bolt and associated nut which serves to attach the third member 3 to each of the first and second members 4, 5 by way of coupling through apertures defined in the third member 3 which are brought into alignment with complementary apertures in the first and second members 4, 5. In certain embodiments, a single aperture is provided in each of the first and second members 4, 5 but a plurality of apertures 34, 36 may be provided along the length of the third member 3 in order to allow the fixed position arrangement between the first and second members 4, 5 to be set to different distances (widths). The ability to adjust the width between the first and second members 4, 5 can be important as this can alter the distance between the hand grip means 12, 13, thus contributing to the comfort of the user, when using the apparatus. For example, the first and second members 4, 5 may be more widely spaced laterally when the apparatus is being used by a male user with broad shoulders, but suitably adjusted to a more narrow lateral spacing when the apparatus is to be used by a female user who may have more narrow shoulders.

First and second surface grip means or padded areas can be provided or defined at either end of the third member 3. These surface grip means or padded areas typically extend laterally outwardly from a region where the third member 3 is conjoined to the first and second members 4, 5 by a suitable distance such that the surface grips or padded areas rest against the outward face of an architrave or door frame when the apparatus is conjoined to a door mounted chin up or pull up bar.

Upper portions 30, 32 of the first and second tubular members 4, 5 are brought into engagement with a substantially horizontal member of a chin up or pull up bar in a releasable manner. Typically the first and second tubular members 4, 5 are brought into releasable engagement with the substantially horizontal member of the chin up or pull up bar. Typically no modifications need to be made to the chin up or pull up bar to which the exercise apparatus of the present invention is being conjoined in order to allow it to become attached. In certain embodiments, the upper portion 30, 32 of the first and second tubular members 4, 5 define, or are attached to hook-like means which are adapted to be hooked over a horizontal or substantially horizontal portion of a chin up or pull up bar. Other joining means can be used to engage the first and second members 4, 5 with the chin up or pull up bar, such as screw mechanisms, clip hooks and the like.

The first, second and third members 4, 5, 3 are made of a rigid material, typically metal, such as iron, steel or the like but not limited thereto. They are typically circular in cross section, although this cross sectional shape may alter, for example, but not limited thereto, where the first and second 4, 5 members are shaped to form the hook-like means or the hand grip means 12, 13.

In a further embodiment, the first and second tubular members 4, 5 can be formed into an X-like arrangement, wherein the first and second tubular members 4, 5 are conjoined at an intermediate point. At this intermediate point, the first and second tubular members are movable, for example, pivotable about a central axis, so that the first and second members 4, 5 interact in a scissors-like folding manner to facilitate storage of the apparatus. In such an embodiment, the third member 3 may be provided to hold upper ends and lower ends of the first and second members 4, 5 at a constant respective distance from each other. In one variation, the third member 3 is foldable and so that it folds out and locks to hold the upper and lower ends of the first and second members 4, 5 at a specific distance apart, and unlocks to fold e.g. in half, or similar, to allow the X-configuration of the first and second members 4, 5 to be brought together into a closed scissor formation for storage. In such a configuration the first member 4 would provide a left-hand side fixing means for engaging the apparatus with a substantially horizontal member of chin up or pull up bar and a right-hand side hand grip means 12, while the second member 5 would provide a right-hand side hand fixing and a left-hand side hand grip means 13 for a user standing with their back to the apparatus.

[Referring to] FIGS. 1 to 5 [there is further illustrated a] *illustrate the* portable exercise apparatus [1 according to the invention which is] *44 shown in FIG. 7A* conjoined to a door mounted pull up bar [comprising] *comprised of* a horizontal cross bar *2* which, when assembled with the exercise apparatus [one] *44* form an upper horizontal bar 2 and a door sill mounting piece (not shown in [the drawings] *FIGS. 1 to 5*). Conjoining the exercise apparatus [1 of the invention] *44* to a pull up bar, such as the doorway mounted pull up bar illustrated provides [a structure] *an exercise apparatus 1* which comprises the door sill mounting piece, the horizontal upper cross bar 2, the third member 3 in the form of a horizontal lower cross bar, two substantially vertical members 4, 5 and two hand grip means 12, 13. Together, the door sill mounting piece, the upper cross bar 2, and the lower cross bar (third member 3) act as a mounting means to mount the exercise apparatus 1 to a door frame structure 20 around a doorway.

The sill mounting piece 40 is configured to engage against an upper sill of a lintel part 8 of the door frame 20. The sill mounting piece rests upon the upper sill on an inner side of the doorway i.e. the side opposite to the side of the door frame visible in FIGS. 1-5.

The upper cross bar 2 is configured to engage against each jamb part 6, 7 of the door frame 20 on an outer side of the doorway i.e. the side visible in FIGS. 1-5. The upper cross bar 2 exerts a force against each jamb part 6, 7 of the door frame 20 in a direction substantially perpendicular to the plane of the doorway. This occurs under gravity, combined with the weight of the user when the apparatus 1 is in use. The upper cross bar 2 engages against an upper region 21, 22 of each jamb part 6, 7 of the frame 20 which is adjacent to the lintel part 8 of the door frame 20. In this case the distance between the upper region 21, 22 of each jamb part 6, 7 of the door frame 20 and the lintel part 8 of the door frame 20 is approximately 0.1 m.

Two curved connector bars 10, 11 are provided [to connect] *that start connected to* the sill mounting piece 40, *continue* to *connect to* the upper cross bar 2 *and then go straight providing substantially horizontal bars*. The lower cross bar (third member 3) is configured to engage against each jamb part 6, 7 of the door frame 20 on the outer side of the doorway via the surface grip means. The lower cross bar exerts a force against each jamb part 6, 7 of the door frame 20 in a direction substantially perpendicular to the plane of the doorway in the same manner as the upper cross-bar 2. The lower cross bar engages against a lower region 23, 24 of each jamb part 6, 7 of the door frame 20 which is spaced apart from the lintel part 8 of the door frame 20. In this case the distance between the lower region 23, 24 of each jamb part 6, 7 of the door frame 20 and the lintel part 8 of the door frame 20 is approximately 1.1 m. The hand grip means 12, 13 act as a support means to support a user performing exercises. The hand grip means 12, 13 are particularly suitable for supporting a user performing bodyweight dip exercises (FIGS. 2 and 3) and/or bodyweight row exercises (FIGS. 4 and 5). Each hand grip means 12, 13 is preferably elongate and the longitudinal axis of each hand grip means 12, 13 extends in a direction substantially perpendicular to the plane of the doorway. The hand grip means 12, 13 facilitate gripping of the exercise apparatus 1 by a user performing exercises. The hand grip means 12, 13 are downwardly spaced apart from the upper cross bar 2 and/or the lintel part 8 of the door frame 20. In this case the distance between the hand grip means 12, 13 and the upper cross bar 2 and/or the lintel part 8 of the door frame 20 is approximately 1.1 m. The hand grip means 12, 13 are configured to be located on the outer side of the doorway at a height which is approximately equal to half of the height of the doorway and is equal roughly to abdomen height. In this case the height of the doorway is 2.2 m, and the hand grip means 12, 13 are located at a height of 1.1 m. In this case the distance between the hand grip means 12, 13 and the lintel part 8 of the door frame 20 is approximately 1.1 m. The two substantially vertical tubular elongate members 4, 5 connect each hand grip means 12, 13 to the upper cross bar 2. Each member 4, 5 is also attached to the lower cross bar (third member 3) as described above with reference to [FIG. 7] *FIGS. 7A, 7B, 7C and 7D.*

The exercise apparatus 1 forces the sill mounting piece against the inner side of the doorway over the architrave, and forces the upper cross bar 2 against the door frame 20 at the outer side of the doorway under gravity, combined with the weight of the user when in use.

The main function of the exercise apparatus 1 is to perform bodyweight dips or bodyweight rows.

In use, the sill mounting piece is positioned resting upon the upper sill of the lintel part 8 of the door frame 20 on the inner side of the doorway. The upper cross bar 2 is positioned engaging against the upper region 21, 22 of each jamb part 6, 7 of the door frame 20 on the outer side of the doorway, and the lower cross bar (third member 3) is positioned engaging against the lower region 23, 24 of each jamb part 6, 7 of the door frame 20 on the outer side of the doorway. The exercise apparatus 1 is thus mounted to the door frame 20. The user may then grip the hand grip means 12, 13 to perform exercises, for example bodyweight dip exercises (FIGS. 2 and 3) and/or bodyweight row exercises (FIGS. 4 and 5).

The invention is not limited to the embodiment hereinbefore described, with reference to the accompanying drawings, which may be varied in construction and detail, the invention being defined in the appended claims.

The invention claimed is:

1. An exercise apparatus mounted to a door frame around a doorway structure for the performance of exercises, said apparatus comprising:

[at least] *a* first and *a* second elongate tubular members, said first and second elongate tubular members being adapted to be brought into a fixed positional arrangement relative to each other, wherein an upper end of each of said first and second elongate members being in releasable engagement with a substantially horizontal upper cross bar of a doorway mounted pull up bar;

*the doorway mounted pull up bar also includes a* first and second connector bars directly connecting a sill mounting piece to the substantially horizontal upper cross bar;

a third member positioned in a substantially horizontal position and releasably conjoinable to each of the first and second elongate tubular members to hold said first and second members at a fixed distance to each other; and a lower end of each of said first and second elongate members is conjoined to first and second hand grip bars, respectively.

2. An exercise apparatus as claimed in claim 1, wherein first and second surface grips are provided or defined at either end of the third member.

3. An exercise apparatus as claimed in claim 2, wherein said first and second surface grips extend laterally outwardly from a region of the third member where the third member is conjoined to the first and second members.

4. An exercise apparatus as claimed in claim 3, wherein the surface grips of the third member are adapted to grip the lower region of a jamb part of the door frame.

5. An exercise apparatus as claimed in claim 4, wherein the third member is configured to exert a force against the jamb part of the door frame in a direction substantially perpendicular to a plane of a doorway.

6. An exercise apparatus as claimed in claim 1, wherein the third member is conjoined to [each of] the first and second members by [a suitable] fixing elements.

7. An exercise apparatus as claimed in claim 6, wherein the fixing elements allow the fixed position arrangement between the first and second members to be set to different distances.

[8. An exercise apparatus as claimed in claim 1, wherein the exercise apparatus comprises the sill mounting piece for engaging against a lintel part of the door frame, and the horizontal upper cross bar for engaging against the door frame.]

9. An exercise apparatus as claimed in claim [8] *1*, wherein the sill mounted piece is configured to engage against the lintel part of the door frame at a first side of the doorway, the horizontal upper cross bar is configured to engage against the jamb parts of the door frame at a second side of the doorway which is opposite to the first [said] *side* of the doorway, and wherein the third member of the exercise apparatus [is adapted to act as a third mounting element] *engages the second side of the doorway*.

10. An exercise apparatus as claimed in claim 1, wherein the first and second hand grip bars extend substantially perpendicular to a plane in which the first and second elongate members[, the horizontal upper cross bar and the third member] are positioned.

[11. An exercise apparatus as claimed in claim 1, wherein the first and second members are releasably engaged with the substantially horizontal upper cross bar of a doorway mounted pull up bar via the first and second connecting bars.]

12. An exercise apparatus as claimed in claim 1, wherein the [first] upper end of each of said first and second elongate members being in releasable engagement with the substantially horizontal upper cross bar of a doorway mounted pull up bar [comprise] *where the upper ends are* hook[-like elements which are adapted to be hooked] *shaped and hook* over the horizontal upper cross bar.

*13. An exercise apparatus mounted to a door frame around a doorway structure for the performance of exercises, said apparatus comprising:*

*a first and a second elongate tubular member, said first and second elongate tubular members being adapted to be brought into a fixed positional arrangement relative to each other wherein a lower end of each of said first and second elongate members is conjoined to first and second hand grip bars, respectively;*

*a door mount pull up bar that includes a first and second connector bars directly connecting a sill mounting piece to a substantially horizontal upper cross bar;*

*wherein an upper end of said first elongate tubular member is configured to be hooked over said first connector bar and an upper end of said second elongate tubular member is configured to be hooked over said second connector bar;*

*a third member positioned in a substantially horizontal position and releasably conjoinable with each of the first and second elongate tubular members to hold said first and second members at a fixed distance to each other.*

*14. The exercise apparatus as claimed in claim 13, wherein the third member is configured to exert a force against the jamb part of the door frame in a direction substantially perpendicular to a plane of a doorway.*

*15. An exercise apparatus as claimed in claim 13, wherein the sill mounted piece is configured to engage against the lintel part of the door frame at a first side of the doorway the substantially horizontal upper cross bar is configured to engage against the jamb parts of the door frame at a second side of the doorway which is opposite to the first side of the doorway, and wherein the third member of the exercise apparatus is configured to engage against the jamb parts of the door frame at the second side of the doorway.*

*16. An exercise apparatus as claimed in claim 13, wherein the first and second hand grip bars extend substantially perpendicular to a plane in which the first and second elongate members are positioned.*

*17. An exercise apparatus as claimed in claim 13, wherein the upper ends of each of said first and second elongate members are hook shaped.*

*18. An exercise apparatus mounted to a door frame around a doorway structure for the performance of exercises, said apparatus comprising:*

*a first and a second elongate tubular members, said first and second elongate tubular members being adapted to be brought into a fixed positional arrangement relative to each other;*

*a door mount pull up bar that includes a first and second connector directly connecting a sill mounting piece to a substantially horizontal upper cross bar, wherein the upper end of said first elongate tubular member is configured to be hooked, screwed or clip-hooked to said first connector bar of the door mount pull up bar and where an upper end of said second elongate tubular member is configured to be hooked, screwed or clip-hooked to said second connector bar of the door mount pull up bar,*

*a third member positioned in a substantially horizontal position and releasably conjoinable to each of the first and second elongate tubular members to hold said first and second members at a fixed distance to each other;*

*a lower end of each of said first and second elongate members is conjoined to first and second hand grip bars, respectively; and*

*wherein the sill mounted piece is configured to engage against the lintel part of the door frame at a first side of the doorway, the horizontal upper cross bar is configured to engage against the jamb parts of the door frame at a second side of the doorway which is opposite to the first side of the doorway, and wherein the third member of the exercise apparatus engages the second side of the doorway.*

*19. An exercise apparatus of claim 16 where the first and second connector bars each have a substantially horizontal portion and the tubular members are connected to substantially horizontal portion of the door mount pull up bar.*

* * * * *